United States Patent [19]

Nakano et al.

[11] Patent Number: 4,993,038

[45] Date of Patent: Feb. 12, 1991

[54] LASER DEVICES, LASER SYSTEM INCLUDING THE LASER DEVICES AND OUTPUT MIRROR FOR THE LASER SYSTEM

[75] Inventors: Noboru Nakano, Chiba; Naoki Kubota, Setagaya; Yoshihisa Miyazaki, Chiba, all of Japan

[73] Assignee: Kawasaki Steel Corporation, Kobe, Japan

[21] Appl. No.: 401,922

[22] Filed: Sep. 1, 1989

[30] Foreign Application Priority Data

Sep. 5, 1988 [JP] Japan .................................. 63-221657
Sep. 12, 1988 [JP] Japan .................................. 63-227778
Jun. 30, 1989 [JP] Japan .................................... 1-169080
Jun. 30, 1989 [JP] Japan .................................... 1-169081

[51] Int. Cl.$^5$ ............................................... H01S 3/08
[52] U.S. Cl. ......................................... 372/92; 372/97; 372/99; 372/72; 372/69
[58] Field of Search ..................... 372/69, 72, 99, 73, 372/75, 92, 97

[56] References Cited

U.S. PATENT DOCUMENTS

| | | |
|---|---|---|
| 3,646,474 | 2/1972 | Segre . |
| 3,967,215 | 6/1976 | Bellak .................................. 372/73 |
| 4,439,861 | 3/1984 | Bradford .............................. 372/75 |
| 4,751,716 | 6/1988 | Ream et al. .......................... 372/72 |
| 4,805,181 | 2/1989 | Gibson et al. ........................ 372/72 |

FOREIGN PATENT DOCUMENTS 0271809 6/1988 European Pat. Off. .

OTHER PUBLICATIONS

Solid-State Laser Engineering, Walter Koechner—Springer-Verlag New York Heidelberg Berlin, 1976—pp. 300-311, vol. 1.
"Diffraction-Limited High-Radiance Nd-Glass Laser System", Journal of Applied Physics, vol. 40, No. 2, Feb. 1969, pp. 511-516.

*Primary Examiner*—Leon Scott, Jr.
*Attorney, Agent, or Firm*—Oliff & Berridge

[57] ABSTRACT

As a beam converger, one having reflective surfaces including partial cylindrical curved surfaces and partial plain surfaces, which surround laser rod and pump lamp plane-parallelly and substantially uniformly in the axial direction thereof, is adopted, so as to make a high beam converging property in the case of adoption of an elliptic cylinder moderate. The axes of the pump lamp and/or the laser rod are shifted to positions closer to the partial cylindrical curved surfaces than the center lines of the partial cylindrical curved surfaces, so as to increase energy of light exciting the laser rod by the pump lamp, thus improving the efficiency. A laser system obtained by combining a resonant type laser device comprising two laser rods and one or two pump lamps with a prism having a regular equilateral triangle shape in cross section, highly contributes to the compactness and simplification of the laser system.

46 Claims, 9 Drawing Sheets

LASER DEVICES, LASER SYSTEM INCLUDING THE LASER DEVICES AND OUTPUT MIRROR FOR THE LASER SYSTEM

BACKGROUND OF THE INVENTION

1. Field of the Invention

This invention relates to laser devices, a laser system including the laser devices and an output mirror for the laser system. The invention is particularly concerned with improvements in laser devices each comprising: one or more axially symmetrical columnar laser media; one or more axially symmetrical columnar pump light sources arranged parallelly to each other and adjoining the laser media; and a beam converger having a reflective surface including two or more partially cylindrical curved surfaces and two or more partial plain surfaces arranged plane-parallelly, said curved surfaces and said plain surfaces plane-parallelly and substantially uniformly surrounding the laser media and the pump light sources in the axial direction thereof. Further, the invention relates to a laser system including the improved laser devices. The invention is concerned with an output mirror capable of being used in the common laser systems, in which a necessary optical component out of incident rays are transmitted and the transmitted light is reflected in a direction opposite of the incident rays.

2. Description of the Prior Art

The laser beams, differing from the common naturally emitted lights, have various characteristics such as the coherence and excellent monochromaticity. Because of these characteristics, the laser beams have been widely used of measuring with high accuracy and high sensitiveness, meteorology, study of nonlinear optics, optical communication and so forth.

FIG. 30 is an explanatory view showing the conventional structure of a laser system using the above-described laser beams. In this drawing, the laser oscillator is comprised of a laser device (a lamp house for the oscillator) 3, a total reflection mirror 5, and a half mirror 9 with a half-transmittable film 2. The laser beams emanated from the laser oscillator are successively reflected rectangularly by prisms 6a, 6b, 6c and 6d and led to a laser device (a lamp house for the amplifier) 4. Upon being amplified by the laser amplifier 4, the laser beams are reflected rectangularly by a prism 6e and thrown to a body to be measured, not shown, and the like. In place of the prisms 6a -6e, total reflection mirrors may be used. In this case, similarly to the prisms 6a -6e, the total reflection mirrors are arranged at positions where the beams are reflected rectangularly.

As the above-described laser devices 3 and 4, as disclosed in Walter Koechner: Solid-State Laser Engineering, pp301-306 (Springer Verlag, 1976) and Japanese Patent Unexamined Publication No. 51-40894 for example, these have been most widely used a device of the type in which a laser rod 12 and a pump lamp 11 are placed at two foci 41 and 42 of a beam converger 10 of an elliptic cylinder as shown in FIG. 31. In this arrangement, being based on the geometrical theorem, the beam converging property is high. In this type, the highest efficiency can be obtained when the laser rod 12 is placed with the pump lamp 11 in close proximity. Furthermore, in Japanese Patent Unexamined Publication No. 50-85291, there is disclosed one in which two pump lamps 11 and 13 are placed on both sides of the laser rod 12 as shown in FIG. 32, and another in which laser rods 12 and 14 are placed on both sides of the pump lamp 11 as shown in FIG. 33.

However, any way, the pump lamps 11, 13 and the laser rods 12, 14 are placed at the foci 41, 42, 43 and 44 of the ellipse, whereby the intensity of the light from the pump lamps becomes extremely high in the vicinity of the axes of the laser rods, thus presenting a problem that optical elements reach the limit of destruction when laser beams are oscillated or amplified and a high output energy cannot be obtained as the whole of beam. Further, there has been another problem that there occur portions of the laser rod to which the light of the pump lamp fails to reach, whereby the output as the whole of beam is decreased.

In order to solve the above mentioned two problems, in Japanese Patent Unexamined Publication No. 62-183193, there is disclosed a laser device in which the axis of the laser rod is shifted from the focal point of the elliptic cylinder. As shown in FIG. 34, in this laser device, the axis 31 of the pump lamp 11 is placed at one focus 41 of the beam converger 10 consisting of the elliptic cylinder and a point within the laser rod is placed at the other focus 42 and axis 32 of the laser rod 12 is shifted between the two foci 41 and 42.

According to this laser device, the distribution of light intensity from the laser rod is improved, however, the degree of uniformity of the distribution is not satisfactory, thus presenting a problem that merely the position of the highest intensity is shifted from the axis of the laser rod.

Furthermore, in the above-described literature by W. Koechner, there are disclosed laser devices of the type having beam convergers which do not form a focus such as a cross-section of a circle, arcs and straight-lines or an oval shape.

Out of the laser devices of this type, one in which the laser rod is placed to the pump lamp in close proximity provides easy fabrication and the distribution of the intensity of the laser is improved. However, it has a problem that the efficiency is low as compared with the laser device of the elliptic cylinder type. Further, the distribution of laser intensity is improved as compared with the elliptic cylinder type, however, it has a problem that the improvement is not satisfactory.

Further, in the above-described literature U.S. Pat. No. 4751716, there is disclosed a laser device of a multiple connection in which a plurality of pump lamps are provided. In the multiple connection type mentioned above is improved in the uniformity of laser intensity in the cross-section of the laser rod as compared with the case of the single pump lamp. However, it leads to a problem that the construction is complicated and large-sized, so that it is not suitable for some application.

The laser system as shown in FIG. 30 has further problems as follows.

Even if the outer dimension of the half mirror 9 in the laser system shown in FIG. 30 is 20 mm for example, the outer dimension of a mirror holder holding the half mirror 9 becomes as much as about 40-=mm. Because of this, in the case where the distance between an optical axis 7 of the laser oscillator 3 and an optical axis 8 of the laser amplifier 4 is as close as about 20-25 mm, there have been necessary the four prisms 6a -6d to pass the oscillated laser beams through the laser amplifier 4 as shown in FIG. 30.

Even when the distance between the optical axis 7 of the laser oscillator 3 and the optical axis 8 of the laser amplifier 4 is more than 25 mm, it has been necessary to provide the half mirror 9 and at least two total reflection mirrors (or one or two prisms).

Consequently, when the optical axes 7 and 8 are close to each other in particular, the number of optical elements such as the prisms 6a –6d is increased as shown in FIG. 30, thus presenting a problem that adjustment of optical axes of the respective optical elements becomes such complicated. In addition, when the number of optical elements is increased, a large space is needed to set and arrange these optical elements, thus presenting a problem that it is difficult to render the laser system compact in size.

SUMMARY OF THE INVENTION

The present invention has been developed to obviate the above-described disadvantages of the prior art and has its first object of the provision of a laser device in which uniformity of the distribution of light intensity emitted from the laser medium is held high, the laser medium is optically excited efficiently and the laser device can be rendered compact in size.

A second object of the present invention is to provide a compact laser system including the above-described laser device.

A third object of the present invention is to provide an output mirror suitable for use in the laser system, in which the number of optical elements is small, adjustment of optical axes and the like is easy and a space factor is satisfactory so as to render the laser system compact in size.

To achieve the above-described first object, the laser device is provided with one or more axially symmetrical columnar laser media; one or more axially symmetrical columnar pump light sources arranged in parallel to each other and adjoining said laser media; and a beam converger having reflective surfaces including two or more partial cylindrical curved surfaces and two or more partial plain surfaces arranged plane-parallelly, said curved surfaces and said plain surfaces plane-parallelly, substantially uniformly surrounding said laser media and said pump light sources in the axial direction thereof; wherein the center lines of said partially cylindrical curved surfaces, the axes of said laser media and the axes of said pump light sources are in one and the same plane; and at least one axis of two laser media, of one laser medium and one pump light source, or of two pump light sources, which are opposed to partial cylindrical curves of said reflective surfaces, is shifted to a position or positions closer to the partial cylindrical curved surface than the center line thereof.

To achieve the above-described first object, the laser device is provided with two axially symmetrical columnar laser media; one or two axially symmetrical columnar pump light sources arranged in parallel to each other and adjoining said laser media; and a beam converger having reflective surfaces including two or more partial cylindrical curved surfaces and two or more partial plain surfaces arranged plane-parallelly, said curved surfaces and said plain surfaces plane-parallelly, substantially uniformly surrounding said laser media and said pump light sources in the axial direction thereof; wherein the center lines of said partial cylindrical curved surfaces, the axes of said laser media and the axes of said pump light sources are in one and the same plane; and at least one axis of two laser media, or of one laser medium and one pump light source, which are opposed to the partial cylindrical curved surfaces of said reflective surfaces, is shifted to a position or positions closer to the partially cylindrical curved surface than the center line thereof.

To achieve the above-described second object, the laser system is provided with the laser device described as above; a total reflection mirror; and a substantially rectangular equilateral triangle-shaped columnar prism; wherein one of the laser media of said laser device is used for oscillating and the other for amplifying; laser beams are reflected in a direction opposite to an incident direction of said laser beams through the axis of the laser medium for oscillating, using the two reflective surfaces; said laser device, said total reflection mirror and said prism are arranged so that the reflected beams are incident on the axis of the laser medium for amplifying; a half-transmittable film is attached to a portion of an inclined surface on which laser beams are incident from the laser oscillator; and said laser device, said total reflection mirror and said prism are arranged so that laser oscillation can be resonant between the portion of the prism attached thereon with the half-transmittable film, said laser medium for oscillating and said total reflection mirror.

To achieve the above-described second object, the laser system is provided with the laser device described as above; a total reflection mirror; an optical substrate; and a substantially rectangular equilateral triangle-shaped columnar prism; wherein one of the laser media of said laser device is used for oscillating and the other for amplifying; laser beams are reflected in a direction opposite to an incident direction of said laser beams through the axis of the laser medium for oscillating, using the two reflective surfaces forming a right angle of said prism as reflective surfaces; said laser device, said total reflection mirror and said prism are arranged so that the reflected beams can be incident on the axis of the laser medium for amplifying; said optical substrate is positioned between said prism and said laser medium for oscillating; a half-transmittable film is attached onto a surface of a portion of said optical substrate on which the laser beams are incident from said laser medium for oscillating; and said laser device, said total reflection mirror and said optical substrate are arranged so that laser oscillation can be resonant between the portion of said optical substrate attached thereon with the half-transmittable film, said laser medium for oscillating and said total reflection mirror.

To achieve the above-described first object, the laser device is provided with an axially symmetrical columnar pump light source; four axially symmetrical columnar laser media surrounding said pump light source and arranged in parallel to one another; and a beam converger having reflective surfaces including four partial cylindrical curved surfaces or four partial cylindrical curved surfaces and four or more partial plain surfaces, said curved surfaces and said plain surfaces plane-parallelly and substantially uniformly surrounding said laser media and said pump light source in the axial direction thereof; wherein the axis of said pump light source coincides with an intersected line between two planes perpendicularly intersecting each other; the center lines of two partial cylindrical curved surfaces and the axes of two laser media opposed to said two partial cylindrical curved surfaces are in one plain surface forming said two plain surfaces perpendicularly intersecting each other; the center lines of the other two partial cylindrical curved surfaces and the axes of the other two laser media opposed to said two partial cylindrical curved surfaces are in another plain surface forming said two plain surfaces perpendicularly intersecting each other; and at least one axis of the four laser media opposed to the partial cylindrical curved surfaces of said reflective surface is shifted to a position closer to the partial cylindrical curved surface than the center line thereof.

To achieve the above-described first object, the laser device is provided with an axially symmetrical columnar laser medium; four axially symmetrical columnar pump light sources surrounding said laser medium and arranged in parallel to one another; and a beam converger having reflective surfaces including four partial cylindrical curves surfaces or four partial cylindrical curved surfaces and four or more partial plain surfaces, said curved surfaces and said plain surfaces plane-parallelly and substantially uniformly surrounding said laser medium and said pump light sources in the axial direction thereof; wherein the axis of said laser medium coincides with an intersected line between two planes perpendicularly intersecting each other; the center lines of two partial cylindrical curved surfaces and the axes of two pump light sources opposed to said two partial cylindrical curved surfaces are in one plane surface forming said two plain surfaces perpendicularly intersecting each other; the center lines of the other two partial cylindrical curved surfaces and the axes of the other two pump light sources opposed to said two partial cylindrical curved surfaces are in another plain surface forming said plain surfaces perpendicularly intersecting each other; and at least one axis of the four pump light sources opposed to the partial cylindrical curved surfaces of said reflective surface is shifted to a position closer to the partial cylindrical curved surface than the center line thereof.

To achieve the above-described third object, the output mirror in which only a necessary optical component out of incident beams is transmitted and the transmitted light is reflected in a direction opposite to the incident beams, is provided with a prism having a substantially regular equilateral triangle shape in cross section and a half-transmittable film is attached to a portion of an inclined surface of said prism on which said laser beams are incident.

To achieve the above-described third object, the output mirror in which only a necessary optical component out of incident beams is transmitted and the transmitted light is reflected in a direction opposite to the incident beams, comprises a prism having a substantially regular equilateral triangle shape in cross section, and an optical substrate or a half-mirror either one of which is provided at least at the side of an incident light path of said prism, said optical substrate being attached with a half-transmittable film onto a surface of its portion of the incident light path.

In the laser device according to the present invention, as the beam converger, one having reflective surfaces formed by the partial cylindrical curved surfaces and the partial plain surfaces plane-parallelly and substantially uniformly surrounding the columnar laser medium and the columnar pump light source in the axial direction thereof is adopted, whereby the high beam converging property occurring in the case of the elliptic cylinder is moderated. In consequence, the light from the pump light source irradiates and excites the laser medium widely and uniformly, whereby the difference between maximum and minimum pump intensities in the laser medium is reduced, so that the light emanated from the laser medium becomes uniform.

Further, the axis of the pump light source and/or the laser medium is shifted to the position closer to the partial cylindrical curved surface than the center line of the partial cylindrical curved surface, so that the energy of light irradiating the laser medium from the pump light source can be increased, thus improving the efficiency.

For this reason, a laser beam having high uniformity of distribution of intensity can be emitted, whereby the light intensity of most of the beam diameter is increased to the destruction limit of the optical elements, so that the output energy can be increased. In addition, the laser device can be rendered compact in size, and moreover, advantageously the structure of the beam converger becomes easier and fabrication cost becomes lower. Because of this, all of the increase in laser output, rendering the laser device compact in size and low fabrication cost of the laser device become possible, thus advantageously offering wide application in the laser beam industry.

Further, in the laser device according to the present invention, when outer diameter of the pump light source opposed to the partial cylindrical curved surface is made smaller than the outer diameter of the laser medium, the light pump efficiency can be further improved. Namely, when the outer diameter of the pump light source is small, the pump light source is seen as a point light source, whereby the beam converging property is raised, so that the energy efficiency can be improved, although the distribution of energy is slightly lowered. In addition, the reflection surface of the beam converger can be made close to the diameter of the laser medium, so that the laser device can be advantageously rendered compact in size.

The present invention is particularly suitable for use in a resonant type laser oscillator consisting of two laser media and one or two pump light sources. A laser system in which the above-described laser device is combined with a prism having a regular equilateral triangle shape in cross section or the like highly contributes to the high compactness and simplification of the laser system.

Furthermore, in the output mirror according to the present invention, a half-mirror and a total reflection mirror are substantially integrated whereby use of a large number of prisms and total reflection mirrors is avoided, so that adjustment in optical axes of the optical elements and the like can be facilitated and a space factor can be improved to render the system including the output mirror compact in size.

In other words, even when the optical axes of the incident beams and the reflected light are placed closer to each other, the number of necessary optical elements is small, operations such as adjustment of optical axes is easy and the space factor is satisfactory, so that the laser system that can be easily rendered compact in size can be realized. In addition, the number of parts is small, the laser system can be easily operated, the distances between the laser beams in parallel to one another can be small and the laser system as a whole can be rendered compact in size, so that utillization of the laser system of this type can widen the applications in the laser industry.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE BEST MODES

Embodiments of the present invention will hereunder be described in detail with reference to the accompanying drawings.

Figure 1:
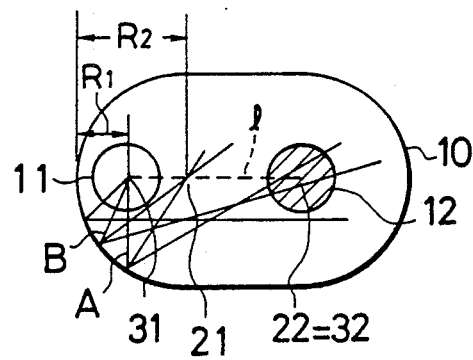
FIG. 1 is a sectional view showing the arrangement of a first embodiment of the laser device according to the present invention.

FIG. 1 is a sectional view showing the arrangement of the first embodiment of the laser device.

The laser device according to this first embodiment comprises: one axially symmetrical laser rod 12; one cylindrical pump lamp 11 arranged in parallel to and adjoining the laser rod 12; and the beam converger 10 having reflective surfaces including two partial cylindrical curved surfaces and two partial plain surfaces arranged plane-parallelly, said curved surfaces and said plain surfaces plane-parallelly, substantially uniformly surrounding the laser rod 12 and the pump lamp 11 in the axial direction thereof; wherein the center lines 21 and 22 of the partial cylindrical curved surfaces, the axis 32 of the laser rod 12 and the axis 31 of the pump lamp 11 are in one and the same plane, and the axis 32 of the laser rod 12 opposed to the partial cylindrical curved surface of the reflective surface is on the center line 22 of the partial cylindrical curved surface, while, the axis 31 of the pump lamp 11 being on a plane 1 connecting the center lines 21 and 22 to each other is shifted to a position closer to the partial cylindrical curved line than the center line 21 thereof.

Figure 2:
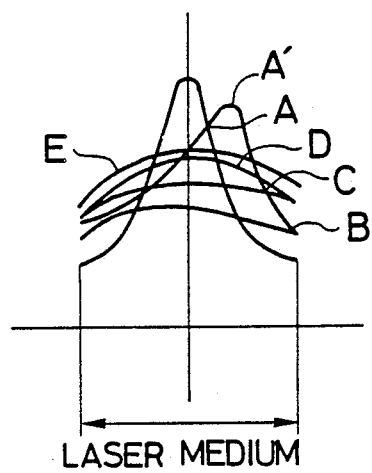
FIG. 2 is a characteristic curve diagram showing examples of the distribution of light intensities emanated from the laser medium.
Figure 3:
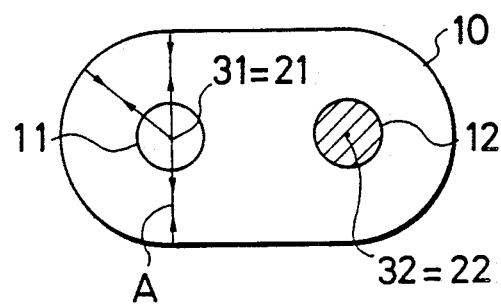
FIG. 3 is a sectional view showing a comparative example of the first embodiment.
Figure 31:
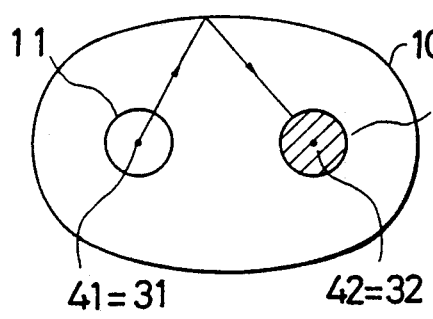
FIG. 31 is a sectional view showing the arrangement of a conventional example disclosed in Japanese Pat. Unexamined Publication No. 51-40894.

With this arrangement, the pump light reflected by the mirror surface of the beam converger 10 widely excites the surface of the laser rod 12, whereby the distribution of light intensity of the light emanated from the laser rod 12 shows a moderate curve as indicated by a characteristic curve C shown in FIG. 2. Namely, in FIG. 2, a characteristic curve A relates to the laser device as shown in FIG. 31 disclosed in Japanese Pat. Unexamined Publication No. 51-40894, and the distribution of light intensity has a difference in height of about 65%. Furthermore, a characteristic curve B relates to the comparative example in which the cross sectional shape of the beam converger 10 consists of half circles and straight-lines but not an ellipse as shown in FIG. 3, and the difference in height of the distribution of light intensity is improved to about 20%. However, the total amount of light energy of the laser beam emanated from this comparative example is decreased by about 40% as compared with the conventional example of FIG. 31. In the case of the first embodiment of the present invention, the distribution of light intensity has the difference in height of only about 20%, thus highly improving the uniformity. Moreover, the total amount of light energy of the laser beam emanated from the laser device according to this embodiment is increased by about 15% as compared with the comparative example in FIG. 3.

As described above, in this arrangement, the distribution of light intensity is improved, and moreover, the total amount of light energy is improved, thus achieving a high efficiency.

The inventors of the present invention studied the reason why the above-described high efficiency was achieved in the following way. Namely, in the comparative example shown in FIG. 3, the whole of light emitted to the left from a perpendicular line A out of rays emanated from the pump lamp 11 returns again to the pump lamp 11 and does not contribute to the absorption of the laser rod 12. In constract thereto, when the axis 31 of the pump lamp 11 is shifted to the outer side (to the left of FIG. 1) of the center line 21 of one of circles of the beam converger 10 as in the first embodiment, the rays which have returned to the pump lamp 11 again in the comparative example shown in the FIG. 3 can be absorbed by the laser rod 12 as indicated by straight lines A and B. For this reason, in this embodiment, the light energy is not wasted as compared with the comparative example, as the result the high efficiency of the total amount of light energy can be achieved.

Furthermore, when the light emitted from the pump lamp 11 returns to the pump lamp 11 again, the returned light is absorbed again by a plasma in the pump lamp 11. For this reason, temperature of the plasma in the pump lamp 11 is raised, emission spectra of the pump lamp 11 is deviated to the side of the short wave length as compared with the case where no beam converger 10 is provided and is shifted from a light absorbing zone of the laser rod 12. In consequence, as compared with the comparative example shown in FIG. 3, the first embodiment has a favorable arrangement, and this fact seems to contribute to the high efficiency of the total amount of light energy.

Further, in the first embodiment the axis 31 of the pump lamp 11 is moved to the outer side of the center line 21 of one of the half circles of the beam converger 10, so that the center lines 21 and 22 of the half circles can be made to approach each other. Because of this, the beam converger 10, i.e., the laser device can be rendered compact by a dimension $(R_2-R_1)$ as compared with the comparative example shown in FIG. 3.

Incidentally, as shown in FIG. 1, when a distance $R_1$ from the end of the beam converger 10 to the axis 31 of the pump lamp 11 satisifes the following relationship or near thereof $$R_1 = \tfrac{1}{2} \cdot R_2$$

where $R_2$ is a radius of the half cylindrical portion of the beam converger 10, it has been confirmed that the most efficient and desirable conditions can be obtained. As the neighbour satisfying the above relationship, the positional relationship wherein the line satisfying $R = \tfrac{1}{2} \cdot R_2$ resides within the pump lamp 11 is advantageous. However, the present invention should not necessarily be limited to the relationship that $R_1 = \tfrac{1}{2} \cdot R_2$ is established or near thereof.

Figure 4:
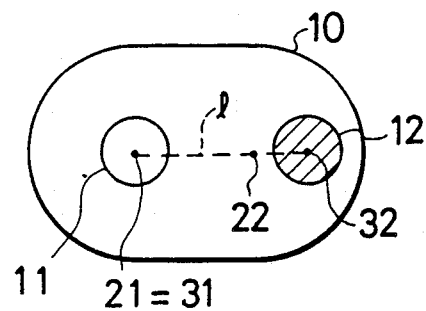
FIG. 4 is a sectional view showing the arrangement of a second embodiment of the laser device according to the present invention.

FIG. 4 is the sectional view showing the arrangement of the second embodiment of the laser device.

According to this second embodiment, in the laser device similar to the one shown in the first embodiment, the axis 31 of the pump lamp 11 is placed on the center line 21 of the partial cylindrical curved surface opposed by the pump lamp 11, while, the axis 32 of the laser rod 12 is shifted to the position closer to the partial cylindrical curved surface than the center line 22 of the partial cylindrical curved surface opposed by the laser rod 12, on the plane l connecting the center lines 21 and 22.

Since other constructions, functions and effects of the second embodiment are similar to those of the first embodiment, detailed description will be omitted.

Figure 5:
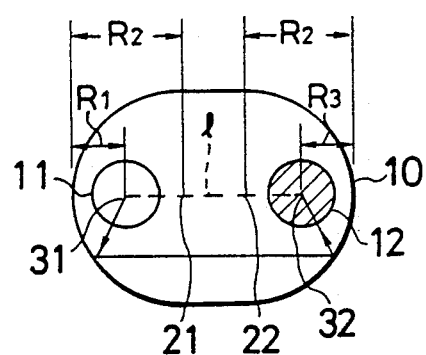
FIG. 5 is a sectional view showing the arrangement of a third embodiment of the laser device according to the present invention.

FIG. 5 is the sectional view showing the arrangement of the third embodiment of the laser device.

According to this third embodiment, in the laser device similar to the one shown in the first embodiment, not only the axis 31 of the pump lamp 11 but also the axis 32 of the laser rod 12 are positioned on an extension of the plane l connecting the center line 22 of one of the partial cylindrical curved surface surrounding the laser rod 12 to the center line 21 of the other of the partial cylindrical curved surface surrounding the pump lamp 11.

With this arrangement, the pump light reflected by the mirror surface of the beam converger 10 and directed to the laser rod 12 is spread in a large scope, so that the difference between maximum and minimum pump intensities in the laser rod 12 is reduced. Namely, the distribution of light intensity emitted from the laser rod 12 becomes one shown by a characteristic curve D in FIG. 2. This characteristic curve D has a difference in height of the distribution of light intensity of 25%, and uniformity of light intensity is slightly deteriorated as compared with the case of the aforesaid first embodiment (about 20%). However, the total amount of light intensity is increased by about 25% as compared with the comparative example shown in FIG. 3.

This third embodiment is rendered compact by a dimension of $2 \times (R_2 - R_1)$ as compared with the comparative example shown in FIG. 3.

Incidentally, in the third embodiment, when the distances $R_1$ and $R_3$ from the end of the beam converger 10 to the axis 31 of the pump lamp 11 and the axis 32 of the laser rod 12, respectively, satisfies the following relationship as shown in FIG. 5 or near thereof $$R_1 = \tfrac{1}{2} \cdot R_2$$

$$R_3 = \tfrac{1}{2} \cdot R_2$$

where $R_2$ is the radius of the half cylindrical portion of the beam converger 10, it has been confirmed that the most efficient and desirable conditions are brought about. Namely, with this arrangement, the laser device being simple in the construction, low in fabrication cost and excellent in the beam converging property can be realized. However, the present invention should not necessarily be limited to the relationship that $R_1, R_3 = \tfrac{1}{2} \cdot R_2$ is established or near thereof.

Figure 6:
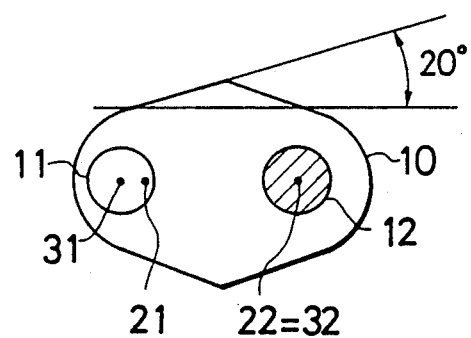
FIG. 6 is a sectional view showing the arrangement of a fourth embodiment of the laser device according to the present invention.

FIG. 6 is the sectional view showing the arrangement of the fourth emodiment of the laser device.

According to this fourth embodiment, in the laser device similar to the one shown in the first embodiment, an angle of aperture of about 20° is formed between planes forming the beam converger 10 and a plane connecting the center line 21 of the partial cylinder surrounding the pump lamp 11 to the center line 22 of the partial cylinder surrounding the laser rod 12.

With this arrangement, the exciting light reflected by the mirror surface of the beam converger 10 and directed to the laser rod 12 is increased, and the distribution of light intensity emitted from the laser rod 12 becomes as indicated by a characteristic curve E in FIG. 2. This characteristic curve E is improved in the difference in height of the distribution of light intensity to about 25%, and the total amount of the energy is increased by about 30% as compared with the comparative example shown in FIG. 3.

Incidentally, this embodiment is obtained by improving the first embodiment, however, the present invention should not be limited to this, and embodiments may be obtained by improving the second or third embodiment.

Figure 7:
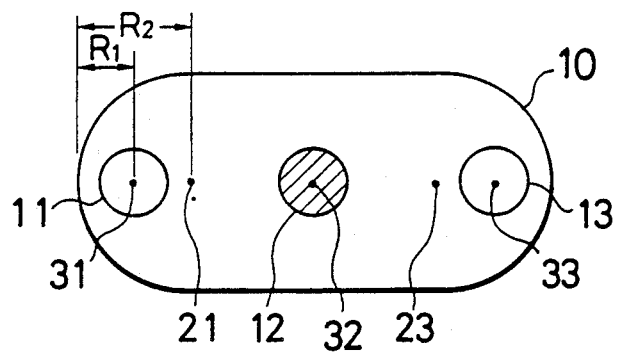
FIG. 7 is a sectional view showing the arrangement of a fifth embodiment of the laser device according to the present invention.

FIG. 7 is the sectional view showing the arrangement of the fifth embodiment of the laser device.

According to this fifth embodiment, in the laser device similar to the one shown in the first embodiment, further, one more pump lamp 13 is added to the side opposite to the pump lamp 11, whereby the laser rod 12 is excited from both sides by the pump lamps 11 and 13.

In this fifth embodiment, similarly to the first embodiment, the center lines 21 and 23 of the partial cylinders of the beam converger 10 surrounding the pump lamp 11 and 13, respectively, are positioned on a plane connecting the axes 31 and 33 of the pump lamps 11 and 13 to the axis 32 of the laser rod 12, and shifted to a position between the axes 31 and 33 (the side closer to the laser road 12). Furthermore, the laser rod 12 is positioned at the center on a plane connecting the axes 31 and 33 of the two pump lamps 11 and 13.

Figure 8:
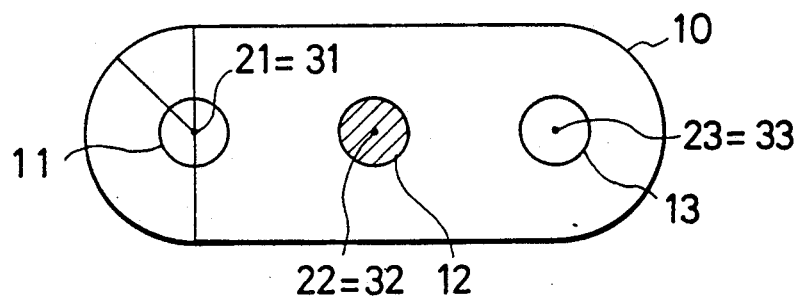
FIG. 8 is a sectional view showing the arrangement of comparative example of the fifth embodiment.
Figure 32:
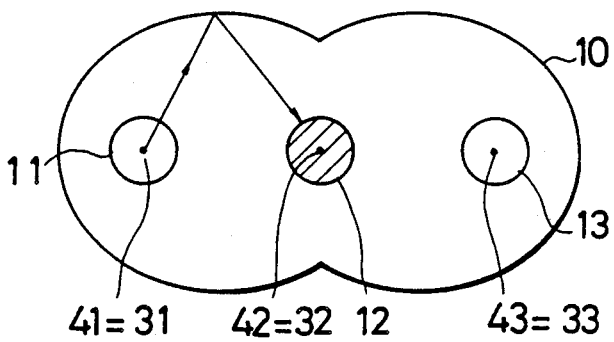
FIG. 32 and 33 are sectional views showing the arrangements of conventional examples disclosed in Japanese Pat. Unexamined Publication No. 50-85291.

In this embodiment, the laser rod 12 is excited from the both sides, so that uniformity of laser intensity in its cross section is improved. Further, with the arrangement according to the present invention, for the reason that is described in the first embodiment, the distribution of light intensity which has had the difference in height of about 65% in the conventional example shown in FIG. 32, is improved to about 20%, and the total amount of light energy is increased by about 15% as compared with the comparative example wherein the axes 31 and 33 of both the pump lamps 11 and 13 are positioned on the center lines 21 and 23 of the partial cylinders as shown in FIG. 8. In addition, this fifth embodiment is rendered compact in size by a dimension of $2 \times (R_2 - R_1)$ as compared with the comparative example shown in FIG. 8.

Incidentally, in this embodiment, $R_1 = \frac{1}{2} \cdot R_2$ is adopted, however, similarly to the first embodiment, the present invention should not necessarily be limited to the relationship that $R_1 = \frac{1}{2} \cdot R_2$ is established or near thereof.

Figure 9:
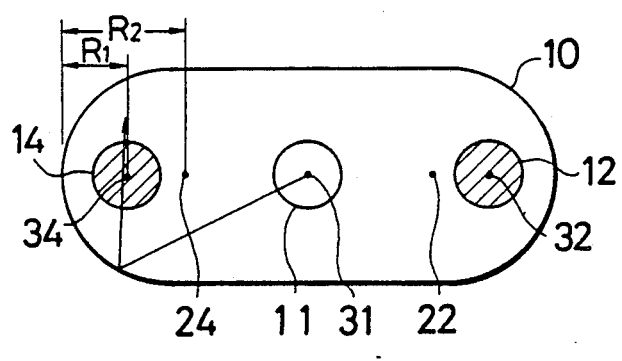
FIG. 9 is a sectional view showing the arrangement of a sixth embodiment of the laser device according to the present invention.

FIG. 9 is the sectional view showing the arrangement of the sixth embodiment of the laser device.

According to this sixth embodiment, in the laser device similar to the one shown in the second embodiment, further, one more laser rod 14 is added to the side opposite to the laser rod 12, whereby the two laser rods 12 and 14 are excited by one pump lamp 11.

In this sixth embodiment, the center lines 22 and 24 of the partial cylinders of the beam converger 10 surrounding the laser rods 12 and 14, respectively, are positioned on an extension of a plane connecting the axes 32 and 34 of the laser rods 12 and 14 to the axis 31 of the pump lamp 11. In addition, the pump lamp 11 is positioned at the center on a plane connecting the axes 32 and 34 of the two laser rods 12 and 14 to each other.

Figure 10:
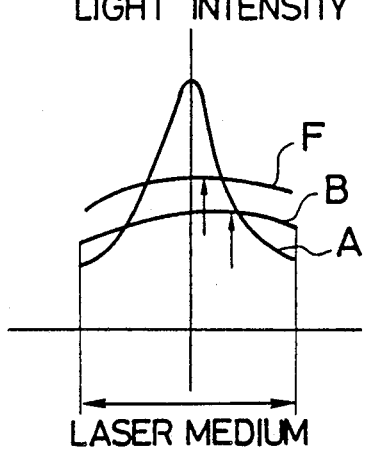
FIG. 10 is a characteristic curve diagram showing examples of the distribution of light intensities emanated from the laser medium.
Figure 11:
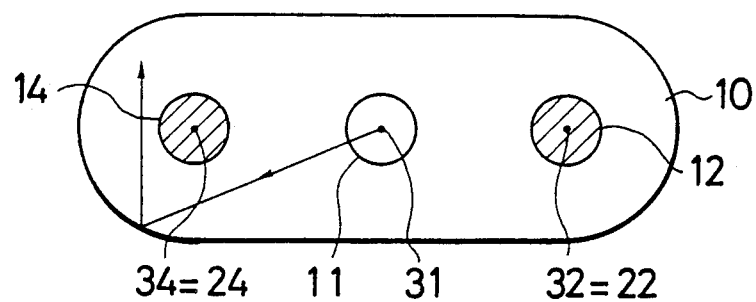
FIG. 11 is a sectional view showing the arrangement of a comparative example of the sixth embodiment.
Figure 33:
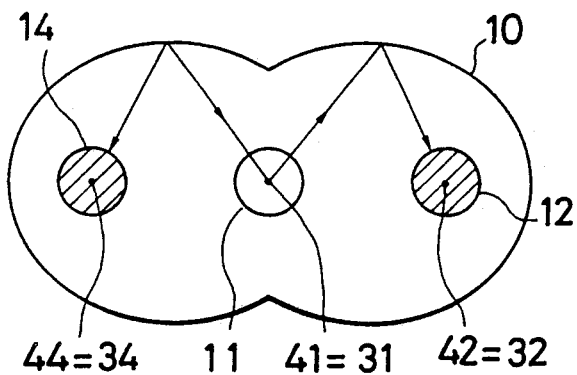

With this arrangement, the pump light reflected by the mirror surface of the beam converger 10 widely excites the surfaces of the laser rods 12 and 14, whereby the distribution of light intensity emitted from the laser rods 12 and 13 forms a moderate curve as indicated by a characteristic curve F shown in FIG. 10. Namely, in FIG. 10, the characteristic curve A relates to the conventional laser device as shown in FIG. 33 disclosed in Japanese Pat. Unexamined Publication No. 50-85291 and has the difference in height of the distribution of light intensity of about 65%. Furthermore, the characteristic curve B relates to the comparative example wherein the axes 32 and 34 of both the laser rods 12 and 14 are positioned on the center lines 22 and 24 of the partial cylinders, as shown in FIG. 11. In this comparative example, the difference of the distribution of light intensity is improved to about 20%. However, the total amount of light energy of the laser beam emitted from the laser device in the comparative example of FIG. 11 is decreased by about 40% as compared with the aforesaid conventional example (the characteristic curve A). In contrast thereto, in the case of the sixth embodiment of the present invention, the distribution of light intensity has only the difference in height of about 20%, so that the intensity distribution is highly improved. Moreover, the total amount of light intensity of the laser beam emitted from the laser device in this embodiment is increased by about 15% as compared with the comparative example shown in FIG. 11.

As described above, in this embodiment, not only the distribution of light intensity is improved, but also the total amount of light energy is increased, thus attaining a high efficiency.

Furthermore, as indicated by an arrow in FIG. 10, the position where the distribution of light intensity in the comparative example in FIG. 11 (curve B) reaches the highest is greatly shifted from the center of the laser medium. However, the position where the distribution of light intensity in the case of the sixth embodiment (curve F) reaches the highest is close to the center of the laser medium.

The inventors of the present invention studied the reason why the non-symmetrical property of the distribution of light intensity was improved and the high efficiency was achieved as described above the following way. Namely, in the comparative example shown in FIG. 11, the laser rod 12 and 14 are intensively excited from their surfaces directed toward the pump lamp 11. As shown in one example in the drawings, the light which has been incident on the cylindrical portion of the beam converger 10 goes away without being thrown onto the laser rod 14, and therefore, does not contribute to the excitation. On the other hand, in the sixth embodiment, the light similar to the above is thrown onto the laser rod 14 as shown in FIG. 9, and therefore, contributes to the excitation. As the result, the non-symmetrical property is more improved than in the case of the comparative example, thus achieving a high efficiency.

Further, in the sixth embodiment, the center lines 22 and 24 of the partial cylinders of the beam converger 10 are moved to the inner side of the axes 32 and 34 of the laser rod 12 and 14, so that the center lines 22 and 24 of the partial cylinders of the beam converger 10 can be brought to be close by the amount of moving. Because of this, the beam converger 10, i.e., the laser device can be rendered compact in size by a dimension of $2\times(R_2-R_1)$ as compared with the case of the comparative example of FIG. 11.

Incidentally, when the distance $R_1$ from the end of the beam converger 10 to the axes 32 and 34 of the laser rods 12 and 14 satisfies the following relationship as shown in FIG. 9 or near thereof $$R_1 = \tfrac{1}{2} \cdot R_2$$

where $R_2$ is the radius of the half cylinders of the beam converger 10, it has been confirmed that the most efficient and desirable conditions are brought about. However, the present invention should not necessarily be limited to the relationship that $R_1 = \tfrac{1}{2} \cdot R_2$ is established or near thereof.

This embodiment is most suitable when the two laser rods 12 and 14 in a single laser device are used as a laser oscillator and a laser amplifier, respectively, so that the laser device can be rendered compact in size.

Figure 12:
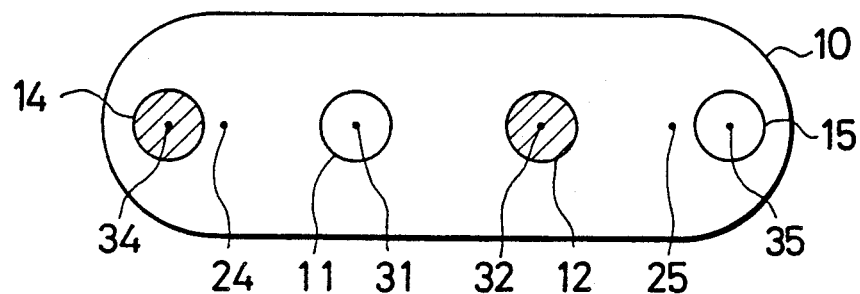
FIG. 12 is a sectional view showing the arrangement of a seventh embodiment of the laser device according to the present invention.

FIG. 12 is the sectional view showing the seventh embodiment of the laser device.

According to the seventh embodiment, in the laser device similar to the one shown in the sixth embodiment, further, one more pump lamp 15 is added to the right side of the laser rod 12, so that the laser rod 12 can be excited by the two pump lamps 11 and 15.

The axis 35 of the pump lamp 15 is positioned on an extension of a plane connecting the center line 25 of the partial cylinder surrounding the pump lamp 15 to the axis 32 of the laser rod 12.

In this embodiment, the laser rod 14 can be used as an oscillator and the laser rod 12 can be used as an amplifier. The rate of amplification of the amplifier can be desirably varied by changing the electric input energy of the added pump lamp 15.

Other details are similar to those of the sixth embodiment, and therefore the description will be omitted. The distributions of light intensity of the both laser rods 12 and 14 showed moderate curves substantially similar to the curve F in FIG. 10.

Figure 13:
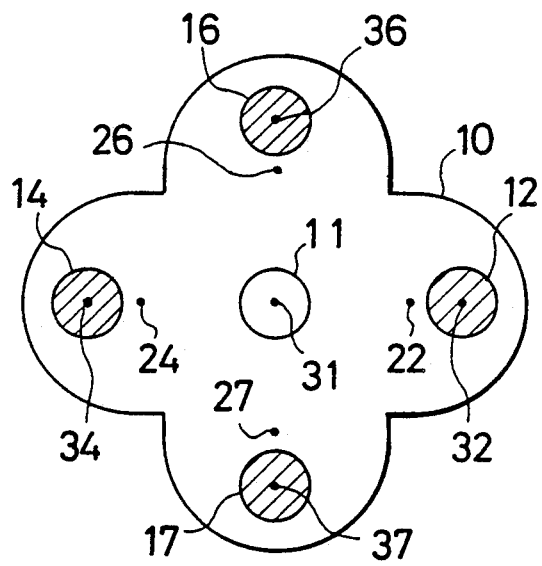
FIG. 13 is a sectional view showing the arrangement of a eighth embodiment of the laser device according to the present invention.

FIG. 13 is the sectional view showing the arrangement of the eighth embodiment of the laser device.

According to this eighth embodiment, in the laser device similar to the one of the sixth embodiment, two laser rods 16 and 17 are added upwardly and downwardly of the pump lamp 11, respectively, whereby the four laser rods 12, 14, 16 and 17 are excited by the single common pump lamp 11.

Similarly to the laser rods 12 and 14, the axes 36 and 37 of the laser rods 16 and 17 are positioned on an extension of a plane connecting the center lines 26 and 27 of the partial cylinders respectively surrounding the laser rods 16 and 17 to the axis 31 of the pump lamp 11.

Other details are similar to those of the sixth embodiment, and therefore the description will be omitted. The distributions of light intensity of the laser rods 12, 14, 16 and 17 showed moderate curves substantially similar to the curve F in FIG. 10.

This embodiment is most suitable when one of the laser rod is used as an oscillator and the remaining three laser rods are used as amplifiers, respectively, so that multiple stage amplification can be conducted.

Figure 14:
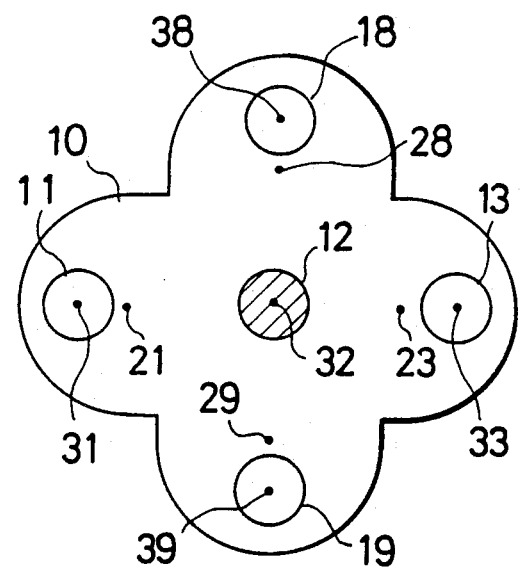
FIG. 14 is a sectional view showing the arrangement of a ninth embodiment of the laser device according to the present invention.

FIG. 14 is the sectional view showing the arrangement of the ninth embodiment of the laser device.

According to this ninth embodiment, in the laser device similar to the one shown in the fifth embodiment, two pump lamps 18 and 19 are added upwardly and downwardly of the laser rod 12, respectively, whereby the single laser rod 12 is excited by the four pump lamps 11, 13, 18 and 19.

Similarly to the pump lamps 11 and 13, the axes 38 and 39 of the pump lamps 18 and 19 are positioned on an extension of a plane connecting the center lines 28 and 29 of the partial cylinders respectively surrounding the pump lamps 18 and 19 to the axis 32 of the laser rod 12.

Other detail are similar to those of the fifth embodiment, and therefore, the description will be omitted. The distributions of light intensity of the laser rod 12 showed more moderate curves than the curve F in FIG. 10.

Incidentally, in the above embodiments, respective outer diameters of the pump lamps 11, 13, 15, 18 and 19 are substantially equal to those of the laser rods 12, 14, 16 and 17. However, the relationship between the sizes of the pump lamps and those of the laser rods should not necessary limited to this.

Particularly, when the outer diameter of the pump lamp is small, since the pump lamp is seen as a point light source, the beam converging property of the beam converger is raised. Although the distribution of light intensity becomes slightly ununiform, the efficency of energy is improved. In addition, it becomes possible to bring the reflective surface of the beam converger 10 to a position close to the diameter of the laser rod, thereby advantageously rendering the laser device compact in size.

The embodiments of the laser device based on the above-described concept will hereunder be described in detail.

Figure 15:
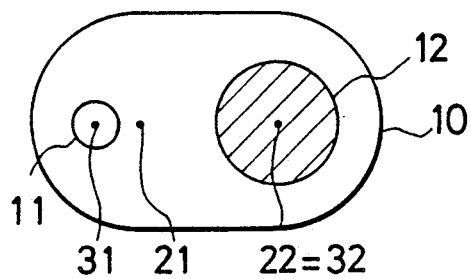
FIG. 15 is a sectional view showing the arrangement of a tenth embodiment of the laser device according to the present invention.

FIG. 15 is the sectional view showing the arrangement of the tenth embodiment of the laser device.

According to this tenth embodiment, in the laser device similar to the one of the first embodiment, the pump lamp 11 which has a similar outer diameter than the diameter of the laser rod 12 is used. Other details are similar to those of the first embodiment, and therefore, the description will be omitted.

In this embodiment, the distribution of light intensity showed a moderate curve substantially similar to curve C in FIG. 2, the difference in height was about 22%, and the distribution of energy was not so deteriorated. The efficiency of energy was better than one in the first embodiment and was increased by 20% from that of the comparative example shown in FIG. 3.

Figure 16:
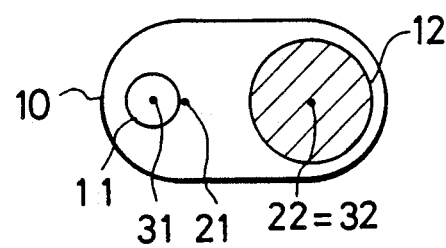
FIG. 16 is a sectional view showing the arrangement of a modification of the tenth embodiment.

Furthermore, in this embodiment, it is possible to decrease the size of the reflective surface to a size closer to the outer shape of the laser rod 12 like a modified example shown in FIG. 16. In consequence, the laser device can be rendered compact in size without changing the energy efficiency and the difference in height of the energy distribution.

Figure 17:
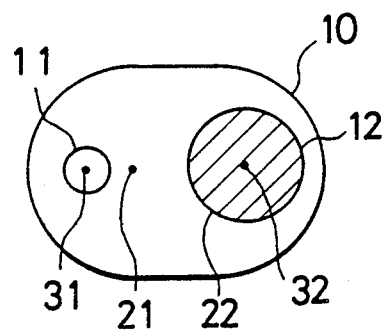
FIG. 17 is a sectional view showing the arrangement of a eleventh embodiment of the laser device according to the present invention.

FIG. 17 is the sectional view showing the arrangement of the eleventh embodiment of the laser device.

According to this eleventh embodiment, in the laser device similar to the one of the third embodiment, the pump lamp 11 which has an outer diameter smaller than the diameter of the laser rod 12 is used. Other details are similar to those of the third embodiment, and therefore, the description will be omitted.

Similarly to the third embodiment, in this eleventh embodiment, the distribution of light intensity showed a moderate curve substantially similar to the curve D shown in FIG. 2, the difference in height is about 27%, and the efficiency of energy is higher by 28% than that of the comparative example in FIG. 3.

Figure 18:
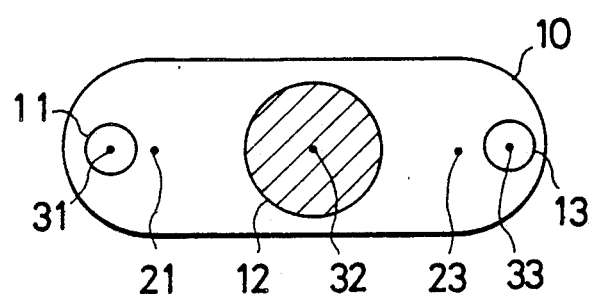
FIG. 18 is a sectional view showing the arrangement of a twelfth embodiment of the laser device according to the present invention.

FIG. 18 is the sectional view showing the arrangement of the twelfth embodiment of the laser device.

According to this twelfth embodiment, in the laser device similar to the one shown in the fifth embodiment, the two pump lamps 11 and 13 which have the outer diameters smaller than the diameter of the laser rod 12 are used. Other details are similar to those of the fifth embodiment, and therefore, the description will be omitted.

In this twelfth embodiment, the difference in height of the distribution of light intensity is 22% and the efficiency of energy is increased by 20% as compared with that of the conventional example in FIG. 32.

Figure 19:
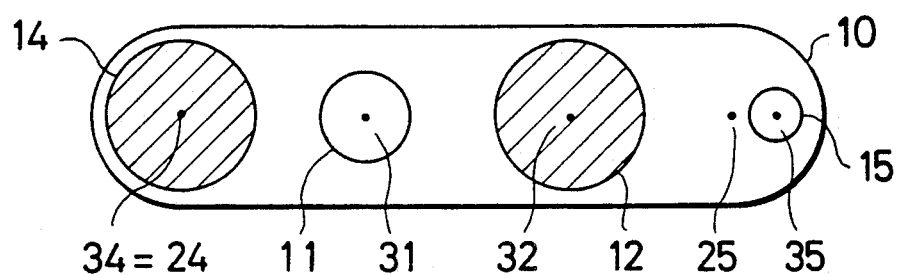
FIG. 19 is a sectional view showing the arrangement of a thirteenth embodiment of the laser device according to the present invention.

FIG. 19 is the sectional view showing the arrangement of the thirteenth embodiment of the laser device.

According to this thirteenth embodiment, in the laser device similar to the one shown in the seventh embodiment, the outer diameter of the pump lamp 11 is smaller than the diameters of the laser rods 12 and 14, and the outer diameter of the pump lamp 15 is further smaller than the outer diameter of the pump lamp 11. Furthermore, the axis 34 of the laser rod 14 is made to coincide with the axis 24 of the partial cylinder. Other details are similar to those of the seventh embodiment, and therefore, the description will be omitted.

In this thirteenth embodiment, the distribution of light intensity of the laser rod 14 showed a moderate curve between the curves B and F in FIG. 10 and the efficiency of energy was increased by 5% as compared with the comparative example shown in FIG. 11. On the other hand, the difference in height of energy efficiency of the laser rod 12 was 22%, while the efficiency of energy was increased 20% as compared with that of the comparative example shown in FIG. 11.

The reason why the outer diameter of the pump lamp 15 is made smaller than that of the pump lamp 11 in this embodiment resides in that the pump lamp 11 excites the two laser rods 12 and 14, whereas the pump lamp 15 excites only the laser rod 12. Particularly, in the case where the laser rod 12 is used as an amplifier and the pump lamp 15 is used for gain control thereof, the outer diameter of the pump lamp 15 may be small.

Figure 20:
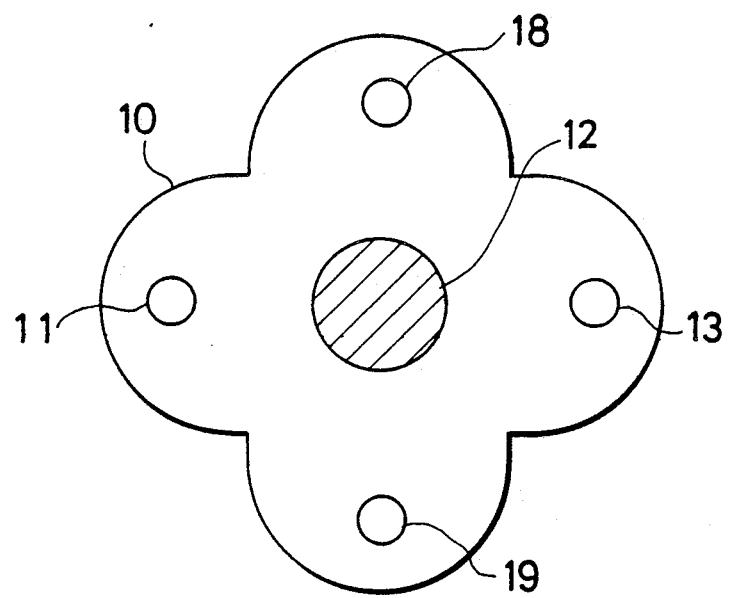
FIG. 20 is a sectional view showing the arrangement of a fourteenth embodiment of a laser device according to the present invention.

FIG. 20 is the sectional view showing the arrangement of the fourteenth embodiment of the laser device.

According to this fourteenth embodiment, in the laser device similar to the one shown in the ninth embodiment, the pump lamps 11, 13, 18 and 19 have outer diameters smaller than that of the laser rod 12. Other details are similar to those of the ninth embodiment, and therefore, the description will be omitted.

In this fourteenth embodiment, the distribution of light intensity of the laser rod 12 showed a moderate curve substantially similar to the curve F in FIG. 10. In addition, the energy efficiency was further increased by about 5% as compared with that of the ninth embodiment.

Incidentally, in the above embodiments, as the pump lamps 11, 13, 15, 18 and 19, cylindrical ones are used and as the laser rods 12, 14, 16 and 17, solid columnar rod shaped ones are used, however, the shapes of the pump light sources an laser media should not necessarily be limited to these. For example, hollow columnar laser media disclosed in U.S. Pat. No. 4751716 may be used.

In these embodiment, a Nd: YAG was mainly used as the laser rod. However, laser media should not necessarily be limited to Nd: YAG. For instance, Nd: Glass, Er: YAG, Nd: YSGG and Ruby can give similar results.

The embodiment of the laser system according to the present invention will hereunder be described in detail.

Figure 21:
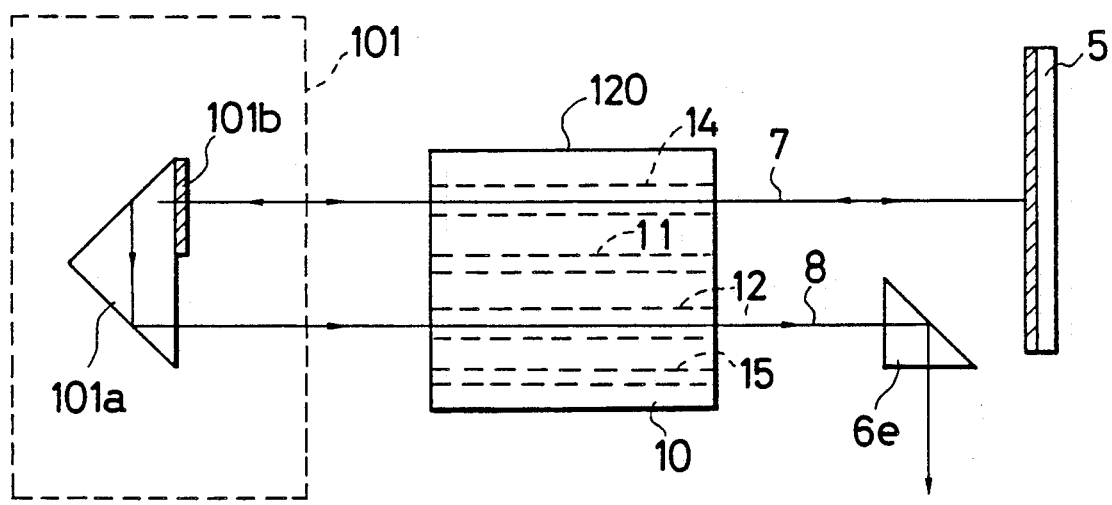
FIG. 21 is an optical path diagram showing the general arrangement of a first embodiment of the laser system according to the present invention.
Figure 30:
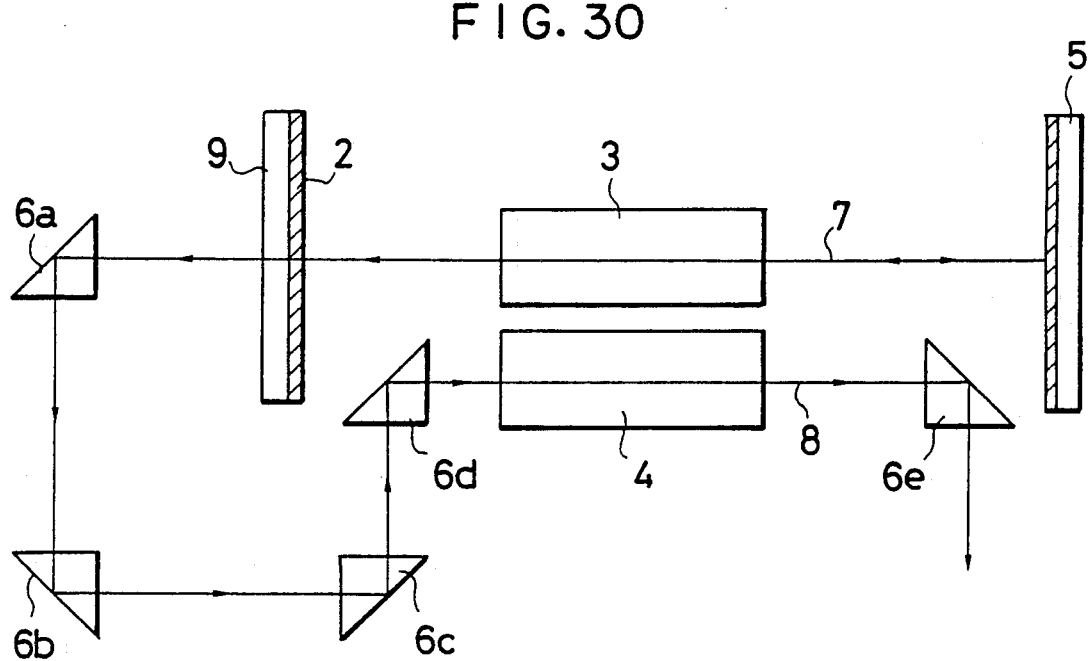
FIG. 30 is an optical path diagram showing the arrangement of a conventional example of the laser system.

FIG. 21 is the optical path diagram showing the general arrangement of the first embodiment according to the present invention relating to the laser system. In the drawing, same reference numerals as shown in FIG. 30 are used to designate same or similar parts. Therefore, overlapped description will be avoided here.

In an output mirror 101 as being the essential portion of the present embodiment, a dielectric multi-layer film, for example, is deposited on portions of inclined surfaces of a prism 101a having a rectangular equilateral triangle shape in cross section, and a half-transmittable film 101b is formed.

Furthermore, as the laser device 120, there is used the one having the two pump lamps 11 and 15 and the two laser rods 12 and 14 as shown in the thirteenth embodiment in FIG. 19 and in the seventh embodiment shown in FIG. 12. Incidentally, there may be used the laser device having one pump lamp 11 and two laser rods 12 and 14 as shown in the sixth embodiment in FIG. 9, the comparative example shown in FIG. 11 and the conventional example shown in FIG. 32.

The laser oscillator is constituted by the half-transmittable film 101b of the output mirror 101, the laser rod 14 of the laser device 120 and the total reflection mirror 5.

In this first embodiment, the laser beams emitted from the laser oscillator (more specifically, the half-tramsittable film 101b) are reflected regularly twice by the prism 101a and thus reflected in a direction opposite to the incident direction. The reflected beams (laser beams) are led to the laser rod 12 of the laser device 120, where the beams are amplified, therefore, the beams are reflected regularly by the prism 6e for example, and thrown to the body to be measured, not shown, or the like.

As apparent from FIG. 21, even if the axes 7 and 8 are as close as several millimeters, the output mirror 101 in this embodiment is usable.

Figure 22:
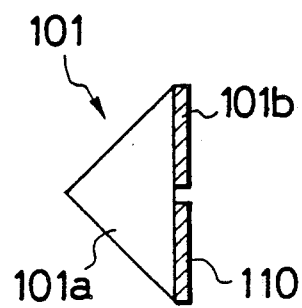
FIG. 22 is a sectional view showing the arrangement of another example of the output mirror used in the first embodiment.

FIG. 22 is the sectional view showing the arrangement of another example of the output mirror 101. In this example, an anti-reflection film 110 is attached to a portion of the inclined surfaces of the prism 101a having the rectangular equilateral triangle shape in cross section (more specifically, a remaining portion of a part where the half-transmittable film 101b is formed).

In this example, such a phenomenon that the laser beams emitted from the laser oscillator constituted by the half-transmittable film 101b, the laser rod 14 of the laser device 120 and the total reflection mirror 5 as shown in FIG. 21 are reflected at the lower portion of the inclined surface of the prism 101a and return to the laser of oscillator again, i.e., a so-called return of light can be avoided by the anti-reflection film 110. Because of this, the return of light described above and the loss of laser beams can be prevented effectively and a further excellent output mirror as compared with the case of the example shown in FIG. 21 can be obtained.

Figure 23:
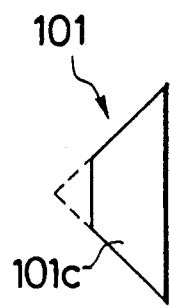
FIG. 23 is a sectional view showing another example of the cross sectional shape of the prism used in the output mirror.

FIG. 23 is the sectional view showing another example of the cross section of the prism 101a used in the output mirror 101. In this example, in place of the prism 101a shown in FIGS. 21 and 22 (having the regular equilateral triangle shape in cross section), a prism 101c having a partial shape thereof, i.e., a trapezoidal shape in cross section (a shape in which a small triangle at the portion of the right angle is removed from the regular equilateral triangle shape) may be used.

In this example, since the laser beams emitted from the laser oscillator are reflected regularly by the inclined surface portions of the trapezoid of a prism 101c shown in FIG. 23, the prism 101c has the function similar to that of the prism 101a shown in the example of FIGS. 21 and 22.

According to the first embodiment of the laser system described in detail with reference to FIGS. 21 through 23, the number of the optical elements is small as compared with the conventional example shown in FIG. 30, adjustment of many optical elements such as the half mirror 9 and the prisms 6a-6d is not necessary, and adjustment of the optical axes of the optical elements can be facilitated. Furthermore, the installation space of the output mirror 101 is by far smaller than the installation space of the half mirror 9 and the prisms 6a -6d, thus improving the space factor. In consequence, the laser system using the above-described output mirror 101 can be rendered compact in size. Moreover, adjustment of the optical axes of the optical elements in the above-described laser system and the like is made easy, with the result that an easily usable laser system is realized.

In this embodiment, when the laser device in FIGS. 9, 11 or 33 is used, since the two laser rods 12 and 14 are excited by the common pump lamp 11, the efficiency is high, and the distance between the optical axes 7 and 8 becomes short as compared with the case of using the two independent laser rods for oscillating and amplifying, respectively, thereby achieving a further compactness.

Figure 24:
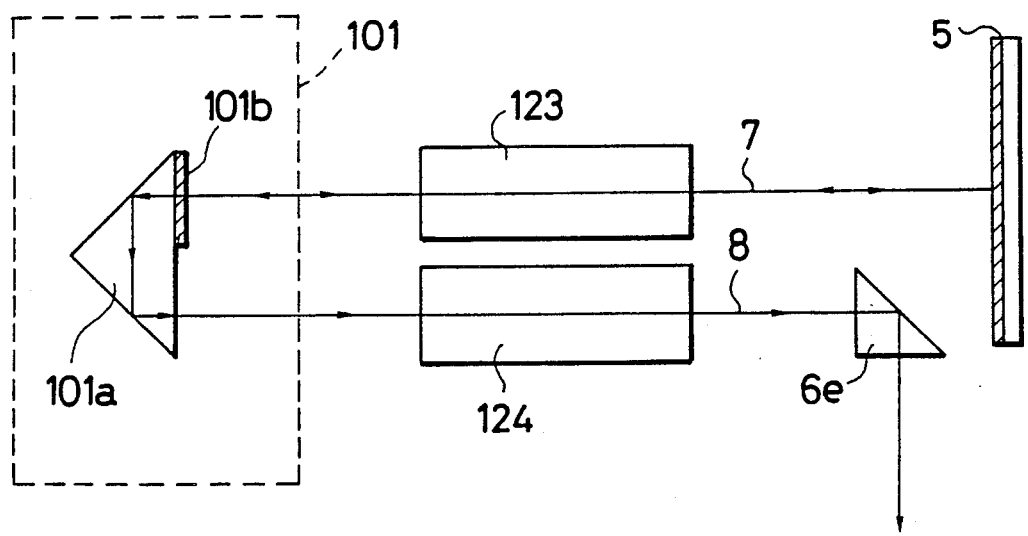
FIG. 24 is an optical path diagram showing the general arrangement of a second embodiment of the laser system according to the present invention.

FIG. 24 is the optical path diagram showing the general arrangement of the second embodiment of the present invention relating to the laser system.

In this embodiment, independent laser devices 123 and 124 for oscillating and amplifying, respectively, are used in place of the common laser device 120 in the first embodiment.

Figure 34:
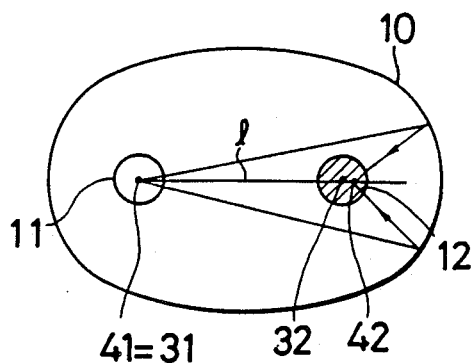
FIG. 34 is a sectional view showing the arrangement of a conventional example disclosed in Japanese Pat. Unexamined Publication No. 62-183193.

As the laser devices 123 and 124, there may be used those shown in the first embodiment shown in FIG. 1, shown in the comparative examples in FIGS. 3 and 8, shown in the second to fifth embodiments in FIGS. 4 to 7, shown in the ninth and tenth embodiments in FIGS. 14 and 15, shown in the modification thereof in FIG. 16, shown in the eleventh and twelfth embodiments in FIGS. 17 and 18, shown in the fourteenth embodiment in FIG. 20 and shown in the conventional examples in FIGS. 31, 32 and 34 for example, in all of which one or a plurality of pump lamps 11... and one laser rod 12 are provided.

The details of this second embodiment is similar to those of the first embodiment except for the laser devices 123 and 124. Therefore, the detailed description will be omitted.

Figure 25:
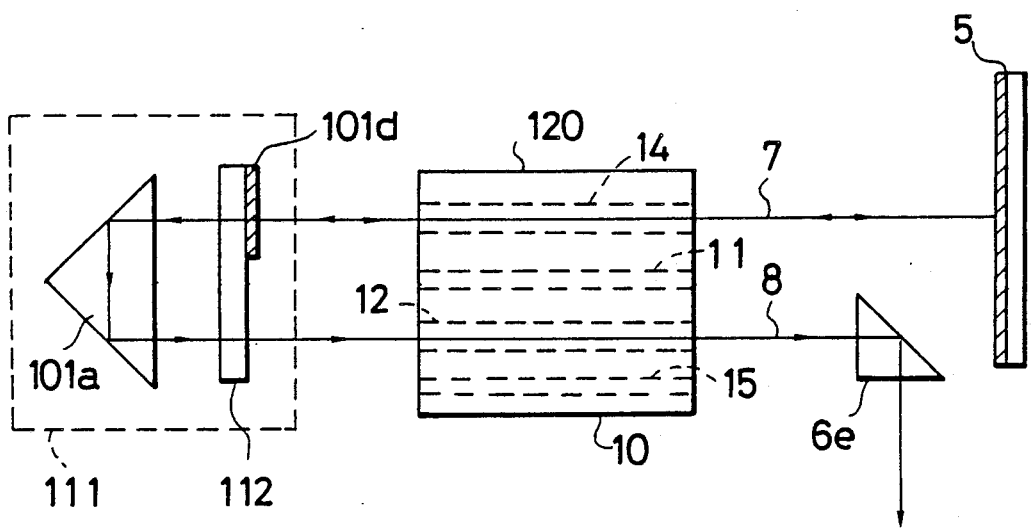
FIG. 25 is an optical path diagram showing the general arrangement of a third embodiment of the laser system according to the present invention.

FIG. 25 is the optical path diagram showing the general arrangement of the third embodiment according to the present invention relating to the laser system. In the drawing, same reference numerals are used to designate the same or similar parts in FIG. 21. Therefore, overlapped description will be avoided.

The output mirror 111 as being the essential portion of this embodiment is constituted by the prism 101a similar to the one in the first embodiment and an optical substrate 112 provided at the side of a laser path of the prism 101a and deposited on the surface of the incident laser path portion thereof (upwardly in the drawing) with a dielectric multi-layer film so as to form a half-transmittable film 101d.

The optical substrate 112 deposited thereon with the half-transmittable film 101d, the laser rod 14 of the laser device 120 and the total reflection mirror 5 constitute a laser oscillator.

In this third embodiment, the laser beams emitted from the above-described laser oscillator (more specifically, the half-transmittable film 101d) are reflected regularly twice by the prism 101a and reflected in a direction opposite to the incident direction. The reflected beams (laser beams) are transmitted through a transparent portion of the optical substrate 112 (downwardly in the drawing), therefore, led to the laser rod 12, where the reflected beams are amplified, thereupon, the amplified beams are reflected regularly by the prism 6e and thrown to the body to be measured, not shown, or the like.

As apparent from FIG. 25, even if the optical axes 7 and 8 are as close as several millimeters, the output mirror 111 of this embodiment is usable.

Figure 26:
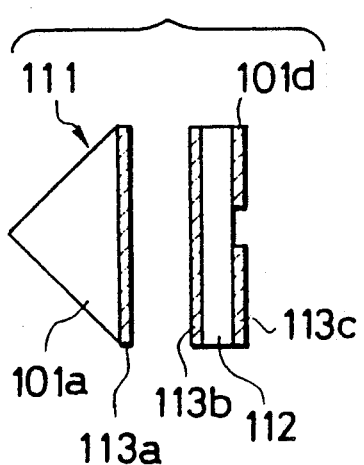
FIG. 26 is a sectional view showing the arrangement of another example of the output mirror used in the third embodiment.

FIG. 26 is the sectional view showing another example of the output mirror 111. In this example, anti-reflection films 113a, 113b and 113c are respectively attached to the inclined surface of the prism 101a having the regular equilateral triangle shape in cross section (other two surfaces as necessary), the rear surface of the optical substrate 112 and a portion of the front surface of the optical substrate 112 (downwardly in the drawing).

In this example, the so-called phenomenon of return of light in which the laser beams emitted from the laser oscillator (more specifically, the half-transmittable film 101d) return to the laser oscillator again is avoided by the anti-reflection films 113a -113c, and the loss of the laser beams can be effectively prevented.

Figure 27:
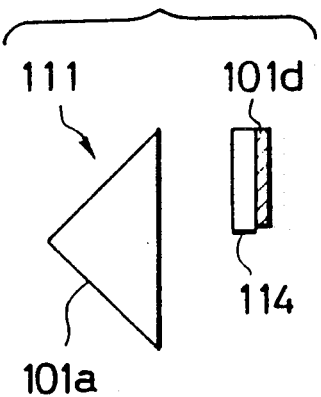
FIG. 27 is a sectional view showing the arrangement of a further example of the output mirror.
Figure 28:
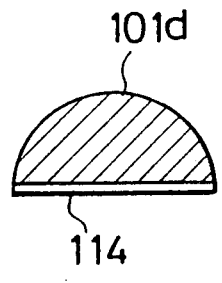
FIG. 28 is a front view showing the shape of the optical substrate in FIG. 27.

FIG. 27 is the sectional view showing a further example of the output mirror 111. In this drawing, 114 designates an optical substrate, and a dielectric multi-layer film is deposited on the surface of the optical substrate 114 to form a half-transmittable film 101d which serves as a half mirror. The shape of the front of the optical substrate 114 formed on the surface thereof with the half-transmittable film 101d is semicircular as shown in FIG. 28.

In this example, since the shape of the front of the optical substrate (half-mirror) 114 is semicircular, even if the optical axes 7 and 8 in FIG. 25 are close to each other, the laser beams emitted from the laser rod 14 for oscillating can be effectively led to the laser rod 12 for amplifying.

Incidentally, in an example shown in FIG. 27, anti-reflection films similar to those shown the example in FIG. 26 are attached to the rear surface of the optical substrate 114 and the inclined surface portion of the prism 101a, so that the return of light of the laser beams emitted from the laser oscillator and the loss of the laser beams can be efficiently prevented.

Furthermore, in place of the prism 101a having the regular equilateral triangle shape in cross section as shown in FIGS. 25 to 27, there may be used a prism 101c having a portion of the regular equilateral triangle as shown in FIG. 23, such for example as a prism having a trapezoidal shape in cross section.

According to the third embodiment of the laser system described in detail with reference to FIG. 25 to 28, the number of the optical elements is small as compared with the conventional example shown in FIG. 30 and adjustment of the optical axes of these optical elements can be made easy. Furthermore, the installation space of the output mirror 111 is by far smaller than the installation space of the half-mirror 9 and the prisms 6a –6d in the conventional example shown in FIG. 30 and the space factor is highly improved. In consequence, the laser system using the output mirror 111 can be rendered compact in size. Moreover, adjustment of the optical axes and the like in the laser system described above is easily made, with the result that an easily usable laser system can be realized.

Figure 29:
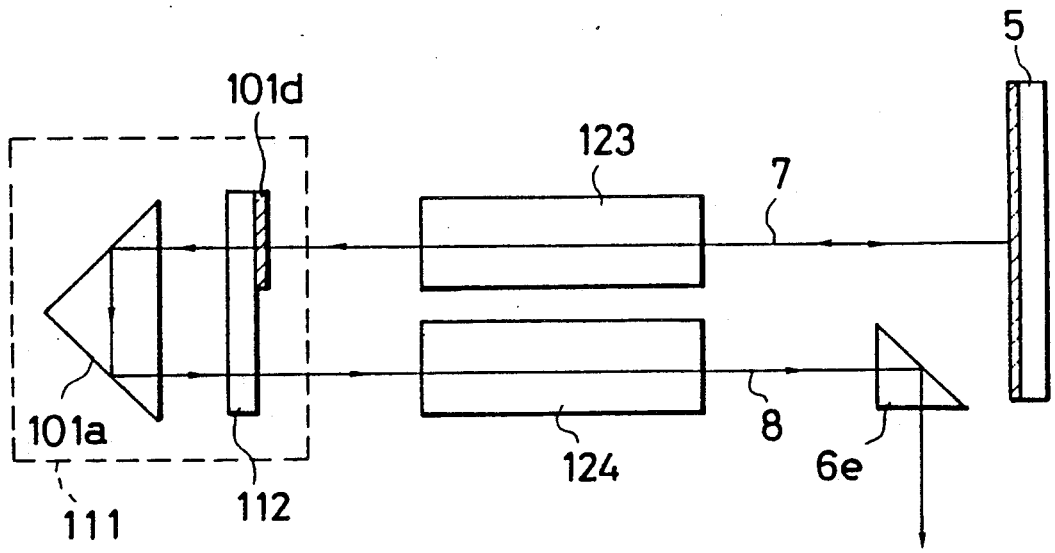
FIG. 29 is an optical path diagram showing the general arrangement of a fourth embodiment of the laser system according to the present invention.

FIG. 29 is the optical path diagram showing the general arrangement of the fourth embodiment of the present invention relating to the laser system.

In this embodiment, independent laser devices 123 and 124 for oscillating and amplifying, respectively, which are similar to those shown in the second embodiment are used in place of the laser device 120 in the third embodiment.

This embodiment has the arrangement similar to that in the third embodiment except for the laser devices 123 and 124, and therefore, detailed description will be omitted.

What is claimed is:

1. A laser device comprising:
   at least one axially symmetrical columnar laser medium;
   at least one axially symmetrical columnar pump light source arranged in parallel to said at least one laser medium; and
   a beam converger having reflective surfaces including at least two partial cylindrical curved surfaces and at least two partial plain surfaces, said plain surfaces being parallel to said at least one laser medium and said at least one pump light source, said curved surfaces and said plain surfaces being interconnected to surround said at least one laser medium and said at least one pump light source in the axial direction thereof;
   wherein the center lines of said partial cylindrical curved surfaces, the axis of said at least one laser medium and the axis of said at least one pump light source are coplanar; and
   at least one axis of the at least one laser medium and the at least one pump light source is shifted to a position closed to one of the partial cylindrical curved surfaces than the center line thereof, thereby improving efficiency and providing a high uniformity of the distribution of light intensity emitted from the at least one laser medium.

2. The laser device as set forth in claim 1, wherein at least one outer diameter of said at least one pump light source is smaller than at least one outer diameter of said at least one laser medium.

3. The laser device as set forth in claim 1 further comprising an output mirror for transmission of an optical component of incident beams transmitted thereto, the optical component being reflected back by the mirror in a direction opposite to the direction of travel of the incident beams, wherein said mirror includes:
   a prism having a substantially rectangular equilateral triangular shape in cross-section, said prism having an inclined surface, and
   a half-transmittable film attached to a portion of the inclined surface of said prism, said portion being adapted to intercept the incident beams.

4. The laser device as set forth in claim 3, wherein an anti-reflection film is attached to another portion of the inclined surface of said prism such that the transmitted optical component exits from said another portion.

5. The laser device as set forth in claim 1, further comprising an output mirror for transmission of an optical component of incident beams transmitted thereto, the optical component being reflected back by the mirror in a direction opposite to the direction of travel of the incident beams, wherein said mirror includes:
   a prism having a substantially rectangular equilateral triangular shape in cross-section,
   an optical substrate positioned to one side of said prism, said substrate being adapted to at least intercept the incident beams, and
   a half-transmittable film being attached to a portion of a surface of said substrate, said film being adapted to intercept the incident beams.

6. The laser device as set forth in claim 5, wherein an anti-reflection film is attached to another portion of the surface of said substrate through which laser light exits.

7. The laser device as set forth in claim 5, wherein said optical substrate is a half-mirror.

8. A laser device comprising:
   two axially symmetrical columnar laser media;
   at least one axially symmetrical columnar pump light source arranged in parallel to said laser media; and
   a beam converger having reflective surfaces including at least two partial cylindrical curved surfaces and at least two partial plain surfaces, said plain surfaces being parallel to said laser media and said at least one pump light source, said curved surfaces and said plain surfaces interconnected to substantially uniformly surround said laser media and said at least one pump light source in the axial direction thereof;
   wherein the center lines of said partial cylindrical curved surfaces, the axes of said laser media and the axis of said at least one pump light source are coplanar; and
   at least one axis of the laser media and the at least one pump light source is shifted to a position closer to one of the partial cylindrical curved surfaces than the center line thereof, thereby improving efficiency and providing a high uniformity to the distribution of light intensity emitted from the laser media.

9. The laser device as set forth in claim 3, wherein at least one outer diameter of said at least one pump light source is smaller than at least one outer diameter of said laser media.

10. The laser device as set forth in claim 8, further comprising an output mirror for transmission of an optical component of incident beams transmitted thereto, the optical component being reflected back by the mirror in a direction opposite to the direction of travel of the incident beams, wherein said mirror includes:
    a prism having a substantially rectangular equilateral triangular shape in cross-section, said prism having an inclined surface, and a half-transmittable film attached to a portion of the inclined surface of said prism, said portion being adapted to intercept the incident beams.

11. The laser device as set forth in claim 10, wherein an anti-reflection film is attached to another portion of the inclined surface of said prism such that the transmitted optical component exits from said another portion.

12. The laser device as set forth in claim 8, further comprising an output mirror for transmission of an optical component of incident beams transmitted thereto, the optical component being reflected back by the mirror in a direction opposite to the direction of travel of the incident beams, wherein said mirror includes:
   a prism having a substantially rectangular equilateral triangular shape in cross-section,
   an optical substrate positioned to one side of said prism, said substrate being adapted to at least intercept the incident beams, and
   a half-transmittable film being attached to a portion of a surface of said substrate, said film being adapted to intercept the incident beams.

13. The laser device as set forth in claim 12, wherein an anti-reflection film is attached to another portion of the surface of said substrate through which laser light exits.

14. The laser device as set forth in claim 12, wherein said optical substrate is a half-mirror.

15. A laser system comprising:
   a laser device comprising: two axially symmetrical columnar laser media; at least one axially symmetrical columnar pump light source arranged in parallel to said laser media; and a beam converger having reflective surfaces including at least two partial cylindrical curved surfaces and at least two partial plain surfaces, said plain surfaces being parallel to said laser media and said at least one pump light source, said curved surfaces and said plain surfaces interconnected to substantially uniformly surround said laser media and said at least one pump light source in the axial direction thereof; wherein the center lines of said partial cylindrical curved surfaces, the axes of said laser media and the axis of said at least one pump light source are coplanar; and at least one axis of the laser media and the at least one pump light source is shifted to a position closer to one of the partial cylindrical curved surfaces than the center line thereof, thereby improving efficiency and providing a high uniformity of the distribution of light intensity emitted from the laser media;
   a total reflection mirror; and
   a substantially rectangular equilateral triangular columnar prism;
   wherein one of said laser media oscillates laser beams and the other of said laser media amplifies laser beams;
   said prism has two reflective surfaces which form a right angle therebetween, said surfaces causing reflection of laser beams in a direction opposite to an incident direction of laser beams travelling through the axis of said oscillating laser medium;
   said laser device, said total reflection mirror and said prism are arranged so that the reflected beams are incident on the axis of said amplifying laser medium;
   a half-transmittable film is attached to a portion of an inclined surface of said prism on which laser beams are incident from the oscillating laser medium; and
   said laser device, said total reflection mirror and said half-transmittable film are arranged to enable oscillated laser beams to be resonant between said half-transmittable film, said oscillating laser medium and said total reflection mirror.

16. The laser system as set forth in claim 5, wherein at least one outer diameter of said at least one pump light source is smaller than at least one outer diameter of said laser media.

17. The laser system as set forth in claim 5, wherein an anti-reflection film is attached to another portion of the inclined surface of said prism.

18. A laser system comprising:
   a laser device comprising two axially symmetrical columnar laser media; at least one axially symmetrical columnar pump light source arranged in parallel to said laser media; and a beam converger having reflective surfaces including at least two partial cylindrical curved surfaces and at least two partial plain surfaces, said plain surfaces being parallel to said laser media and said at least one pump light source, said curved surfaces and said plain surfaces interconnected to substantially uniformly surround said laser media and said at least one pump light source in the axial direction thereof; wherein the center lines of said partial cylindrical curved surfaces, the axes of said laser media and the axis of said at least one pump light source are coplanar; and at least one axis of the laser media and the at least one pump light source is shifted to a position closer to one of the partial cylindrical curved surfaces than the center line thereof, thereby improving efficiency and providing a high uniformity of the distribution of light intensity emitted from the laser media;
   a total reflection mirror;
   an optical substrate; and
   a substantially rectangular equilateral triangle-shaped columnar prism;
   wherein one of said laser media oscillates laser beams and the other of said laser medial amplifies laser beams;
   said prism has two reflective surfaces which form a right angle therebetween, said surfaces causing reflection of laser beams in a direction opposite to an incident direction of laser beams travelling through the axis of said oscillating laser medium;
   said laser device, said total reflection mirror and said prism are arranged to enable the reflected beams to be incident on the axis of said amplifying laser medium;
   said optical substrate is positioned between said prism and said oscillating laser medium;
   a half-transmittable film is attached to a surface of a portion of said optical substrate such that laser beams from said oscillating laser medium are incident on said half-transmittable film; and
   said laser device, said total reflection mirror and said optical substrate are arranged to enable oscillated laser beams to be resonant between the portion of the optical substrate having the half-transmittable film attached thereto, said oscillating laser medium and said total reflection mirror.

19. The laser system as set forth in claim 8, wherein at least one outer diameter of said at least one pump light source is smaller than at least one outer diameter of said laser media.

20. The laser system as set forth in claim 8, wherein an anti-reflection film is attached to another portion of said optical substrate.

21. A laser device comprising:
an axially symmetrical columnar pump light source;
four axially symmetrical columnar laser media surrounding said pump light source and arranged in parallel to one another; and
a beam converger having reflective surfaces including four partial cylindrical curved surfaces and at least four partial plain surfaces, said curved surfaces and said plain surfaces being interconnected and substantially uniformly surrounding said laser media and said pump light source in the axial direction thereof;
wherein the axis of said pump light source coincides with an intersected line between two planes perpendicularly intersecting each other;
the center lines of two of the partial cylindrical curved surfaces and the axes of two laser media opposed to said two partially cylindrical curved surfaces are in one of the two planes, the center lines of the other two partial cylindrical curved surfaces and the axes of the two other said laser media opposed to said other two partial cylindrical curved surfaces are in the other of the two planes; and
at least one axis of the four laser media is shifted to a position closer to one of the partial cylindrical curved surfaces than the center line thereof, thereby improving efficiency and providing a high uniformity of the distribution of light intensity emitted from the laser media.

22. The laser device as set forth in claim 21, further comprising an output mirror for transmission of an optical component of incident beams transmitted thereto, the optical component being reflected back by the mirror in a direction opposite to the direction of travel of the incident beams, wherein said mirror includes:
a prism having a substantially rectangular equilateral triangular shape in cross-section, said prism having an inclined surface, and
a half-transmittable film attached to a portion of the inclined surface of said prism, said portion being adapted to intercept the incident beams.

23. The laser device as set forth in claim 22, wherein an anti-reflection film is attached to another portion of the inclined surface of said prism such that the transmitted optical component exits from said another portion.

24. The laser device as set forth in claim 21, further comprising an output mirror for transmission of an optical component of incident beams transmitted thereto, the optical component being reflected back by the mirror in a direction opposite to the direction of travel of the incident beams, wherein said mirror includes:
a prism having a substantially rectangular equilateral triangular shape in cross-section,
an optical substrate positioned to one side of said prism, said substrate being adapted to at least intercept the incident beams, and
a half-transmittable film being attached to a portion of a surface of said substrate, said film being adapted to intercept the incident beams.

25. The laser device as set forth in claim 24, wherein an anti-reflection film is attached to another portion of the surface of said substrate through which laser light exits.

26. The laser device as set forth in claim 24, wherein said optical substrate is a half-mirror.

27. A laser device comprising:
an axially symmetrical columnar pump light source;
four axially symmetrical columnar laser media surrounding said pump light source and arranged in parallel to one another; and
a beam converger having reflective surfaces including four partial cylindrical curved surfaces, said curved surfaces substantially uniformly surrounding said laser media and said pump light source in the axial direction thereof;
wherein the axis of said pump light source coincides with an intersected line between two planes perpendicularly intersecting each other;
the center lines of two of the partial cylindrical curved surfaces and the axes of two laser media opposed to said two partially cylindrical curved surfaces are in one of the two planes, the center lines of the other two partial cylindrical curved surfaces and the axes of the two other said laser media opposed to said other two partial cylindrical curved surfaces are in the other of the two planes; and
at least one axis of the four laser media is shifted to a position closer to one of the partial cylindrical curved surfaces than the center line thereof, thereby improving efficiency and providing a high uniformity of the distribution of light intensity emitted from the laser media.

28. The laser device as set forth in claim 27, further comprising an output mirror for transmission of an optical component of incident beams transmitted thereto, the optical component being reflected back by the mirror in a direction opposite to the direction of travel of the incident beams, wherein said mirror includes:
a prism having a substantially rectangular equilateral triangular shape in cross-section, said prism having an inclined surface, and
a half-transmittable film attached to a portion of the inclined surface of said prism, said portion being adapted to intercept the incident beams.

29. The laser device as set forth in claim 28, wherein an anti-reflection film is attached to another portion of the inclined surface of said prism such that the transmitted optical component exits from said another portion.

30. The laser device as set forth in claim 27, further comprising an output mirror for transmission of an optical component of incident beams transmitted thereto, the optical component being reflected back by the mirror in a direction opposite to the direction of travel of the incident beams, wherein said mirror includes:
a prism having a substantially rectangular equilateral triangular shape in cross-section,
an optical substrate positioned to one side of said prism, said substrate being adapted to at least intercept the incident beams, and
a half-transmittable film being attached to a portion of a surface of said substrate, said film being adapted to intercept the incident beams.

31. The laser device as set forth in claim 30, wherein an anti-reflection film is attached to another portion of the surface of said substrate through which laser light exits.

32. The laser device as set forth in claim 30, wherein said optical substrate is a half-mirror.

33. A laser device comprising:
an axially symmetrical columnar laser medium;

four axially symmetrical columnar pump light sources surrounding said laser medium and arranged in parallel to one another; and a beam converger having reflective surfaces including four partial cylindrical curved surfaces and at least four partial plain surfaces, said curved surfaces and said plain surfaces substantially uniformly surrounding said laser medium and said pump light sources in the axial direction thereof;

wherein the axis of said laser medium coincides with an intersected line between two planes perpendicularly intersecting each other;

the center lines of two of the partial cylindrical curved surfaces and the axes of two pump light sources opposed to said two partial cylindrical curved surfaces are in one of the two planes, the center lines of the other two partial cylindrical curved surfaces and the axes of the two other said pump light sources opposed to said other two partial cylindrical curved surfaces are in the other of the two planes; and at least one axis of the four pump light sources is shifted to a position closer to one of the partial cylindrical curved surfaces than the center line thereof, thereby improving efficiency and providing a high uniformity of the distribution of light intensity emitted from the laser medium.

34. The laser device as set forth in claim 13, wherein at least one outer diameter of said four pump light sources is smaller than the outer diameter of said laser medium.

35. The laser device as set forth in claim 33, further comprising an output mirror for transmission of an optical component of incident beams transmitted thereto, the optical component being reflected back by the mirror in a direction opposite to the direction of travel of the incident beams, wherein said mirror includes:

a prism having a substantially rectangular equilateral triangular shape in cross-section, said prism having an inclined surface, and a half-transmittable film attached to a portion of the inclined surface of said prism, said portion being adapted to intercept the incident beams.

36. The laser device as set forth in claim 35, wherein an anti-reflection film is attached to another portion of the inclined surface of said prism such that the transmitted optical component exits from said another portion.

37. The laser device as set forth in claim 33, further comprising an output mirror for transmission of an optical component of incident beams transmitted thereto, the optical component being reflected back by the mirror in a direction opposite to the direction of travel of the incident beams, wherein said mirror includes:

a prism having a substantially rectangular equilateral triangular shape in cross-section, an optical substrate positioned to one side of said prism, said substrate being adapted to at least intercept the incident beams, and a half-transmittable film being attached to a portion to a surface of said substrate, said film being adapted to intercept the incident beams.

38. The laser device as set forth in claim 37, wherein an anti-reflection film is attached to another portion of the surface of said substrate through which laser light exits.

39. The laser device as set forth in claim 37, wherein said optical substrate is a half-mirror.

40. A laser device comprising:

an axially symmetrical columnar laser medium;

four axially symmetrical columnar pump light sources surrounding said laser medium and arranged in parallel to one another; and a beam converger having reflective surfaces including four partial cylindrical curved surfaces, said curved surfaces substantially uniformly surrounding said laser medium and said pump light sources in the axial direction thereof;

wherein the axis of said laser medium coincides with an intersected line between two planes perpendicularly intersecting each other;

the center lines of two of the partial cylindrical curved surfaces and the axes of the two pump light sources opposed to said two partial cylindrical curved surfaces are in one of the two planes, the center lines of the other two partial cylindrical curved surfaces and the axes of the two other said pump light sources opposed to said other two partial cylindrical curved surfaces are in the other of the two planes; and at least one axis of the four pump light sources is shifted to a position closer to one of the partial cylindrical curved surfaces than the center line thereof, thereby improving efficiency and providing a high uniformity of the distribution of light intensity emitted from the laser medium.

41. The laser device as set forth in claim 15, wherein at least one outer diameter of said four pump light sources is smaller than the outer diameter of said laser medium.

42. The laser device as set forth in claim 40, further comprising an output mirror for transmission of an optical component of incident beams transmitted thereto, the optical component being reflected back by the mirror in a direction opposite to the direction of travel of the incident beams, wherein said mirror includes:

a prism having a substantially rectangular equilateral triangular shape in cross-section, said prism having an inclined surface, and a half-transmittable film attached to a portion of the inclined surface of said prism, said portion being adapted to intercept the incident beams.

43. The laser device as set forth in claim 42, wherein an anti-reflection film is attached to another portion of the inclined surface of said prism such that the transmitted optical component exits from said another portion.

44. The laser device as set forth in claim 40, further comprising an output mirror for transmission of an optical component of incident beams transmitted thereto, the optical component being reflected back by the mirror in a direction opposite to the direction of travel of the incident beams, wherein said mirror includes:

a prism having a substantially rectangular equilateral triangular shape in cross-section;

an optical substrate positioned to one side of said prism, said substrate being adapted to at least intercept the incident beams, and a half-transmittable film being attached to a portion of a surface of said substrate, said film being adapted to intercept the incident beams.

45. The laser device as set forth in claim 44, wherein an anti-reflection film is attached to another portion of the surface of said substrate through which laser light exits.

46. The laser device as set forth in claim 44, wherein said optical substrate is a half-mirror.

* * * * *